Patented Oct. 28, 1924.

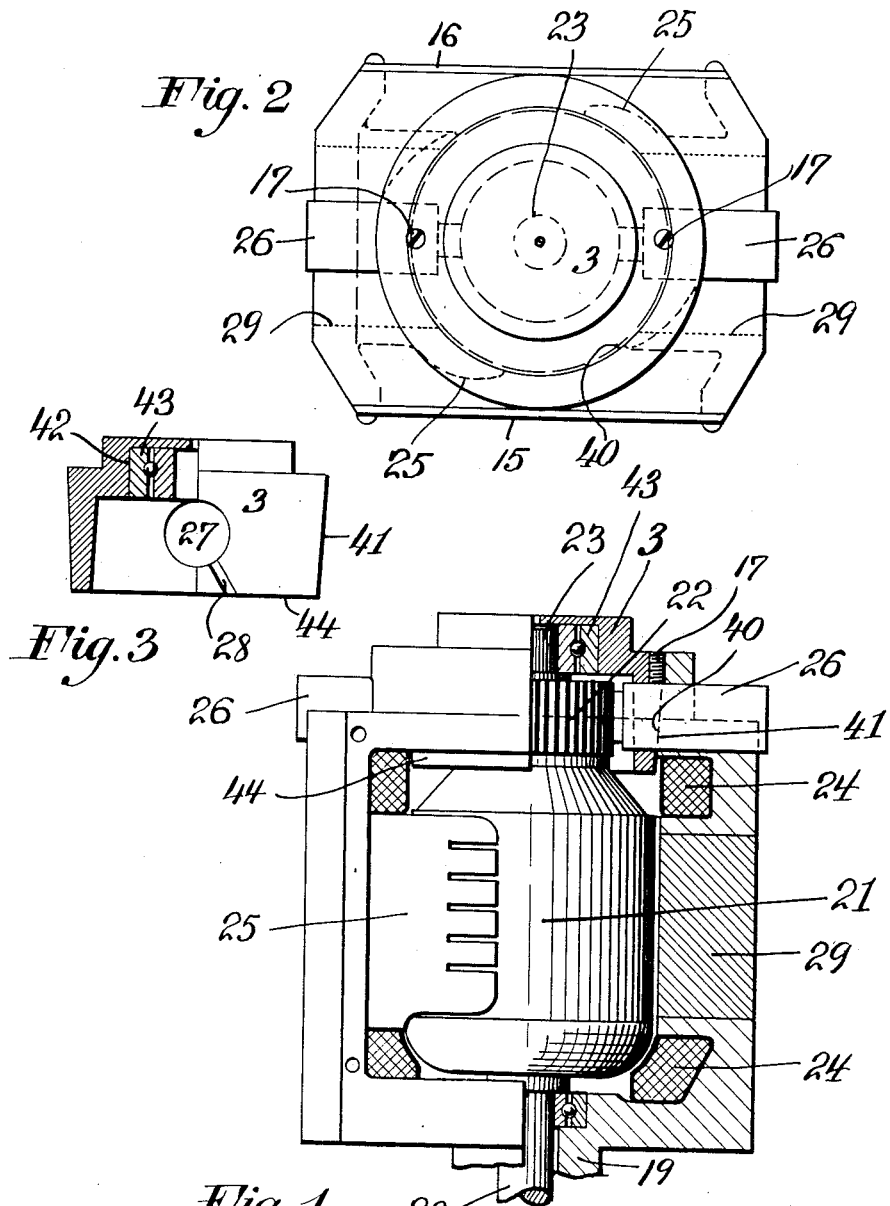

1,513,303

UNITED STATES PATENT OFFICE.

EDWARD M. WARING, OF BROOKLYN, NEW YORK.

ELECTRIC MOTOR.

Original application filed May 26, 1916, Serial No. 100,105. Divided and this application filed June 16, 1921. Serial No. 477,909.

*To all whom it may concern:*

Be it known that I, EDWARD M. WARING, a citizen of the United States, and resident of Brooklyn, in the county of Kings and State of New York, have invented certain new and useful Improvements in Electric Motors, of which the following is a specification.

This invention relates to electric motors and the object of the invention is to provide a generally improved electric motor adapted for quantity production because of simplicity of parts, a minimum of parts required and ease in making and assembling. Another object of the invention is to produce a motor in which the coefficient of magnetic leakage is low.

This application is a divisional application of the application for patent filed May 26, 1916, Serial Number 100,015 for improvements in cutting machines which became a patent on July 12, 1921, Number 1,384,107. The motor herein referred to is especially well adapted for use with electrical cutting machines and similar tools and appliances in that the motor according to this invention is capable of being made in relatively small sizes. The features of the invention, are, however, not limited as to size.

With these and other objects in view my invention is embodied in a motor as hereinafter described and as illustrated in the accompanying drawing in which—

Figure 1 is a semi-sectional elevation of a motor embodying the invention with one of the covers removed to show the interior construction, the field magnet coils being both shown in section.

Figure 2 is an end view of the motor.

Figure 3 is a side and semi-sectional view of one of the parts which serves as a bearing for the armature shaft and encloses the commutator.

Referring to the drawing the reference numeral 21 denotes the armature of the motor. 22 is the commutator and 23 the armature shaft. 24 denotes the field coils and 25 the pole pieces embracing the armature. 26, 26 are the brush holders with the brushes and 27 in Figure 3 shows the holes through which the brush holders pass. 28 shows one of the grooves for a connection (not shown) to one of the brush holders. 29, 29 represent cylindrical pieces of high magnetic permeability, such as Swedish iron, to give to the magnetic field the advantage of high conductivity, especially through the parts surrounded by the field coils.

In Figure 2 the numerals 15 and 16 represent covers suitably fastened. They may be made with or without apertures and may be fastened in any suitable manner for ready removal for the purposes of cleaning or inspection. The covers are preferably of non-magnetic material whereby magnetic leakage is largely avoided.

The aforesaid object of this invention to lower the coefficient of magnetic leakage is acomplished by having no part of the magnetic material of the frame near the pole tips, so that a large percentage of the magnetic lines of force must pass through the armature core to be employed usefully instead of being short-circuited through adjacent parts of the frame as is usual in other forms of enclosed motors. Ample cross section is provided for the magnetic circuit by the parts of the frame back of the coils and by the portions which partly embrace them, thence across through both ends, the walls of the cylindrical portion at one end, with its close fitting stopper-like commutator housing affording a good path of low reluctance.

It is evident from an inspection of the drawing that this construction forms a very compact, substantial and easily made motor because the frame consists of only two castings on which very little machine work is necessary. The part shown in Figure 3 fits into the larger frame like a cork in a bottle. The bore 40 for the part 3 may be first made of the same interior diameter as the pole pieces and then afterwards be slightly tapered to receive the part 3, which by its broad contact surface 41 assists in reducing the reluctance of the magnetic circuit and conveniently forms a seat 42 for the upper bearing 43 for the armature shaft 23 and a cylindrical housing for the commutator 22. The lower portion 44 protruding through the opening 40 serves to keep the field coils in place and the combination of the two castings forms a good and secure seat for the brush holders 26, which are held in place by friction and set screws as 17, 17 which also secure the part 3.

Pieces 29, 29 as aforesaid of high magnetic permeability may be pressed into reamed holes in the casting to increase the magnetic permeability when advantageous to do so, so that material such as cast iron may be used. I do not, however, limit myself to these additional pieces 29 and the motor may be made of two simple castings of material of high magnetic permeability, when such is obtainable.

The polar extensions are made as shown in Figure 1 so that the field coils may be easily slipped into place and retained, besides which the relations of the pole pieces and field coils offer magnetic advantages in relation to the armature reaction as will be understood.

A hub 19 may be provided through which the armature shaft projects, to which in turn suitable couplings or parts to be driven may be attached. These elements are not shown as they form no part of this invention.

It will further be understood that I do not intend to limit myself to the exact disclosure herein but that changes may be made within the principle of the invention and the scope of the appended claims.

I claim:—

1. An electric motor comprising an armature mounted upon an armature shaft, field coils disposed about said armature so as to include it within their magnetic circuit, pole pieces partly embracing said armature, a frame of magnetic material housing said field coils, armature and pole pieces, and a stopper-shaped member fitting into said housing and adapted to form a substantial part of the magnetic circuit and to hold the bearings for the armature shaft in alinement, the said frame and the said stopper shaped member being bored to receive brush holders, brush holders in said borings and means for securing said brush holders in position.

2. The combination of an armature, a field frame partly enclosing the same, asymmetrical pole pieces projecting from said frame towards said armature, an armature shaft, a tapered member fitting into said frame to form a support for the one end of the said armature shaft, and brush holders secured in said frame and said tapered member.

3. The combination of an armature, a field frame partly enclosing the same, pole pieces projecting from said frame towards said armature, an armature shaft, a tapered stopper member fitted into said frame to form a support for the one end of the said armature shaft, said tapered stopper-member having a recess for receiving the commutator end of the said armature, said frame and said tapered stopper-member being bored to receive brush holders, brush holders in said borings projecting inwardly into the said recess and means for securing said brush holders in position.

EDWARD M. WARING.